US006950793B2

(12) United States Patent
Ross et al.

(10) Patent No.: US 6,950,793 B2
(45) Date of Patent: Sep. 27, 2005

(54) SYSTEM AND METHOD FOR DERIVING NATURAL LANGUAGE REPRESENTATION OF FORMAL BELIEF STRUCTURES

(75) Inventors: Steven I. Ross, S. Hamilton, MA (US); Jeffrey G. MacAllister, Chestnut Hill, MA (US); Julie F. Alweis, Belmont, MA (US)

(73) Assignee: International Business Machines Corporation, Armonk, NY (US)

(*) Notice: Subject to any disclaimer, the term of this patent is extended or adjusted under 35 U.S.C. 154(b) by 569 days.

(21) Appl. No.: 10/044,464

(22) Filed: Jan. 10, 2002

(65) Prior Publication Data

US 2002/0173960 A1 Nov. 21, 2002

Related U.S. Application Data

(60) Provisional application No. 60/261,372, filed on Jan. 12, 2001.

(51) Int. Cl.[7] ........................ G08F 17/27; G10L 21/00; G08N 5/00

(52) U.S. Cl. ............................. 704/9; 704/270; 706/45

(58) Field of Search ........................... 704/9, 258, 270; 706/45

(56) References Cited

U.S. PATENT DOCUMENTS

| | | | | |
|---|---|---|---|---|
| 4,729,096 A | | 3/1988 | Larson | |
| 4,736,296 A | | 4/1988 | Katayama et al. | 364/419 |
| 4,914,590 A | | 4/1990 | Loatman et al. | |
| 5,101,349 A | * | 3/1992 | Tokuume et al. | 704/9 |
| 5,239,617 A | * | 8/1993 | Gardner et al. | 706/11 |
| 5,282,265 A | * | 1/1994 | Rohra Suda et al. | 706/11 |
| 5,383,121 A | | 1/1995 | Letkeman | 364/419.11 |
| 5,386,556 A | | 1/1995 | Hedin et al. | 395/600 |
| 5,390,279 A | | 2/1995 | Strong | |
| 5,642,519 A | | 6/1997 | Martin | |
| 5,677,835 A | * | 10/1997 | Carbonell et al. | 704/8 |
| 5,678,052 A | | 10/1997 | Brisson | 395/754 |
| 5,748,841 A | | 5/1998 | Morin et al. | 395/2.66 |
| 5,812,977 A | | 9/1998 | Douglas | |
| 5,867,817 A | | 2/1999 | Catallo et al. | |

(Continued)

FOREIGN PATENT DOCUMENTS

WO WO 99/05671 2/1999

OTHER PUBLICATIONS

McGlashan, S., "Towards Multimodal Dialog Management," Jun. 1996, Proceedings of Twente Workshop on Language Technology 11, pp. 1–10.

MSDN Online Web Workshop, Active Accessibllity Support [online], [retrieved on May 30, 2001]. Retrieved from the Internet (URL:http://msdn.microsoft.com/workshop/browser/accessiblilty/overview/overview.asp) (6 pages).

Spoken Language Dialog Systems, pp. 1–2, Nov. 15, 2000, http://www.mriq.edu.au/ltg/slp803D/class/Jones/overview.html (downloaded May 16, 2001).

*Primary Examiner*—David L. Ometz
*Assistant Examiner*—Brian Albertalli

(57) ABSTRACT

A conversation manager processes spoken utterances from a user of a computer, and develops responses to the spoken utterances. The conversation manager includes a reasoning facility and a language generation module. Each response has a domain model associated with it. The domain model includes an ontology (i.e., world view for the relevant domain of the spoken utterances and responses), lexicon, and syntax definitions. The language generation module receives a response in the form of a formal belief structure from other components of the conversation manager. The reasoning facility selects a syntax template to use in generating a response output from the formal belief structure. The language generation module produces the response output based on the formal structure, the selected syntax template, and the domain model.

20 Claims, 5 Drawing Sheets

U.S. PATENT DOCUMENTS

| | | | | | |
|---|---|---|---|---|---|
| 5,873,064 | A | | 2/1999 | De Armas et al. | |
| 5,918,222 | A | * | 6/1999 | Fukui et al. | 707/1 |
| 5,937,385 | A | | 8/1999 | Zadrozny et al. | |
| 5,960,384 | A | | 9/1999 | Brash | 704/9 |
| 6,023,669 | A | * | 2/2000 | Suda et al. | 704/2 |
| 6,044,347 | A | | 3/2000 | Abella et al. | |
| 6,073,102 | A | | 6/2000 | Block | |
| 6,138,100 | A | | 10/2000 | Dutton et al. | 704/275 |
| 6,192,110 | B1 | | 2/2001 | Abella et al. | |
| 6,192,339 | B1 | | 2/2001 | Cox | |
| 6,208,972 | B1 | | 3/2001 | Grant et al. | |
| 6,233,559 | B1 | | 5/2001 | Balakrishnan | |
| 6,311,159 | B1 | * | 10/2001 | Van Tichelen et al. | 704/275 |
| 6,314,402 | B1 | | 11/2001 | Monaco et al. | |
| 6,334,103 | B1 | | 12/2001 | Surace et al. | |
| 6,466,654 | B1 | | 10/2002 | Cooper et al. | |
| 6,519,562 | B1 | | 2/2003 | Phillips et al. | |
| 6,542,868 | B1 | | 4/2003 | Badt et al. | |
| 6,604,075 | B1 | | 8/2003 | Brown et al. | |
| 6,647,363 | B2 | | 11/2003 | Claassen | |
| 6,721,706 | B1 | * | 4/2004 | Strubbe et al. | 704/275 |
| 6,728,692 | B1 | * | 4/2004 | Martinka et al. | 706/45 |
| 6,748,361 | B1 | | 6/2004 | Comerford et al. | |

* cited by examiner

SYSTEM AND METHOD FOR DERIVING NATURAL LANGUAGE REPRESENTATION OF FORMAL BELIEF STRUCTURES

RELATED APPLICATIONS

This application claims the benefit of U.S. Provisional Application No. 60/261,372, filed Jan. 12, 2001. This application is related to U.S. application Ser. No. 09/931,505, filed Aug. 16, 2001, U.S. application Ser. No. 10/044,289 filed Oct. 25, 2001 entitled "System and Method for Relating Syntax and Semantics for a Conversational Speech Application," concurrently filed U.S. application Ser. No. 10/044,760 entitled "Method and Apparatus for Converting Utterance Representations into Actions in a Conversational System," and concurrently filed U.S. application Ser. No. 10/044,647 entitled "Method and Apparatus for Performing Dialog Management in a Computer Conversational Interface." The entire teachings of the above applications are incorporated herein by reference.

BACKGROUND OF THE INVENTION

Speech enabling mechanisms have been developed that allow a user of a computer system to verbally communicate with a computer system. Examples of speech recognition products that convert speech into text strings that can be utilized by software applications on a computer system include the ViaVoice™ product from IBM®, Armonk, N.Y., and NaturallySpeaking Professional from Dragon Systems, Newton, Mass. In particular a user may communicate through a microphone with a software application that displays output in a window on the display screen of the computer system.

The computer system then processes the spoken utterance (e.g., audible input) provided by the user and determines a response to that input. The computer system transforms the response into an audible output that is provided through a speaker connected to the computer system, so that the user can hear the audible output that represents the response. The computer system typically produces an audible output in a form, such as common English language words, that the user can recognize. In one traditional approach, the computer system selects the response from a predefined menu or list of words or stock phrases.

SUMMARY OF THE INVENTION

When questions or responses to the user are derived by a reasoning system, they must eventually be translated back into natural language for communication to a human. The usual approach taken in conventional systems is to simply provide fixed phrases, to be output to the user at various points in a dialog between the user and the computer. Typically, the user input must conform to a limited number of phrases and words (e.g., menu approach) and the audible output provided to the user likewise follows a limited number of phrases and words stored in the memory of the computer system.

The present invention provides a language generation method that performs its work in the context of a domain model for a particular application. A domain model consists of several types of information. The most basic of these is the ontology, in which a developer specifies the entities, classes, and attributes that define the domain of discourse for a particular application. A lexicon provides information about the vocabulary used to talk about the domain. With the addition of syntax templates expressed in terms of the ontology definitions, a grammar can be automatically generated for the domain, and output questions and responses in the domain can also be generated. Rules allow some simple automated reasoning within the domain, which provides an approach for the appropriate syntax template to be chosen for generating the output in response to the user. One example of the ontology, lexicon and syntax templates suitable for use with the present invention is described in copending U.S. Patent Application "System and Method for Relating Syntax and Semantics for a Conversational Speech Application," filed Oct. 25, 2001.

According to the present invention, a language generation (LG) module uses syntax templates (in conjunction with information contained in the ontology and lexicon) to generate questions and responses to the user. The language generation module uses rules to select which syntax templates to use for a given goal or propositions (goals and propositions are the formal belief structures manipulated by the reasoning component of the conversational system). Either questions or answers can be generated. Questions are the natural output form for unrealized goals from the reasoning system; answers are the natural output form for propositions from the reasoning system.

The present invention provides for consistency between the input and output, without requiring the user to conform to a limited set of fixed phrases, as in conventional approaches. This provides for a "say what you hear" consistency. The best way to train a user how to speak to the system is to use the same language used by the user when speaking to the user. When the recognition vocabulary or grammar is changed, a conventional, fixed spoken phrase implementation requires that the fixed phrases be changed. In any conventional system using fixed phrases, the spoken phrases rapidly drift apart from the recognition vocabulary, due to the difficulty of manually maintaining this correspondence.

The conversational system should echo synonyms chosen by the user, where possible. For example, if the user asks to "create an appointment," the present invention would be able to respond with "the appointment has been created" rather than a fixed, constant response of "the meeting has been scheduled," as would be typical of some conventional systems. This approach of the present invention gives the dialog a more natural and personal feel. It also avoids user confusion in thinking that there may be some subtle difference between the words spoken and the response.

In one aspect of the present invention, a method and system is provided for a system for generating a response output to be provided to a user of a computer. The system includes a language generator and a reasoning facility. The language generator receives a response representation specifying a structured output for use as the basis for the response output to the user. The response representation is associated with a domain model for a speech-enabled application. The reasoning facility selects a syntax template based on a goal-directed rule invoked in response to the response representation. The language generator produces the response output based on the selected syntax template, the response representation, and the domain model. The syntax template may be a template associated with the domain model or a language generator (LG) syntax template associated with the language generator. If the syntax template is a LG template, then the LG template may reference one or more of the domain model syntax templates.

In one aspect of the present invention, the language generator receives the response representation from the reasoning facility. The reasoning facility generates the response representation based on the domain model, a goal-directed rules database, and a spoken utterance provided by the user.

In another aspect, the response representation is a goal or proposition based on the spoken utterance.

In a further aspect, the proposition comprises an attribute, an object, and a value.

The language generator, in another aspect, generates a goal based on the response representation and provides the goal to the reasoning facility. The reasoning facility determines the selected syntax template based on the goal-directed rule selected from a goal-oriented rules database based on the goal. The goal-directed rule identifies the selected syntax template.

In another aspect, the domain model includes an ontological description (ontology) of the domain model based on entities, classes, and attributes, and a lexical description (lexicon) providing synonyms and parts of speech information for elements of the ontological description.

In a further aspect, the response output is a text string capable of conversion to audio output.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
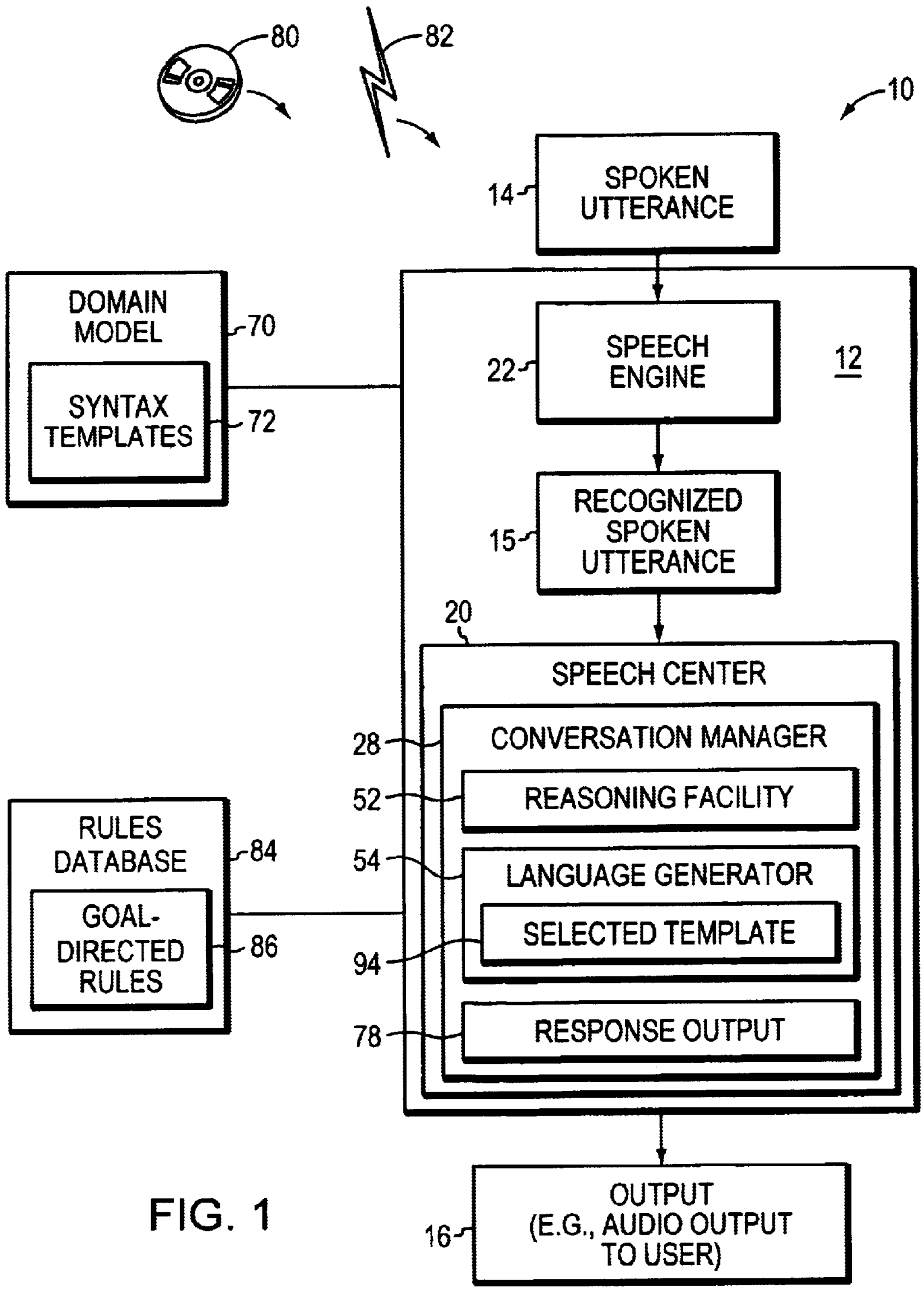
FIG. 1 is a block diagram of a preferred embodiment in a computer system.
Figure 2:
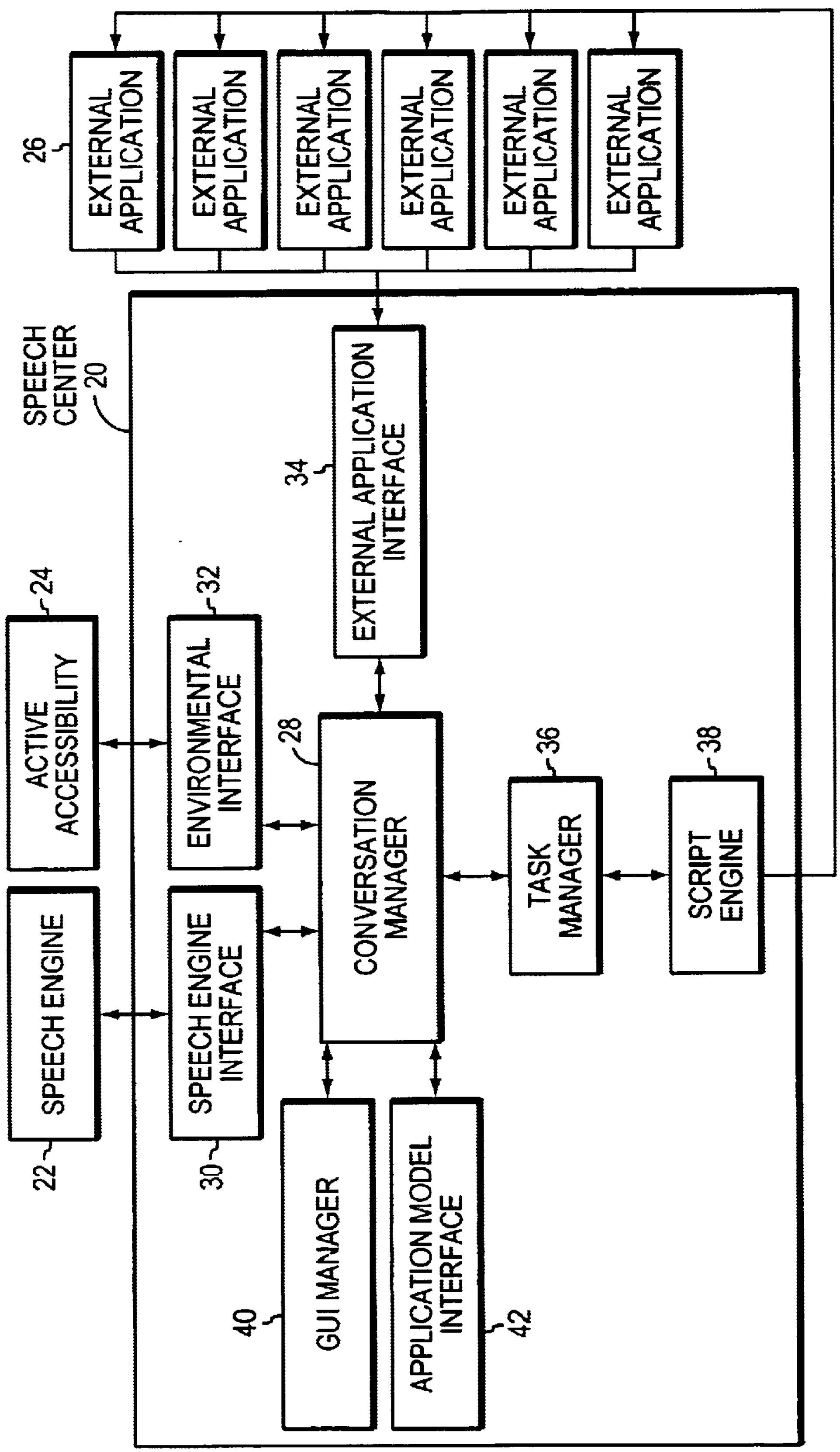
FIG. 2 is a block diagram of the components of the speech center system illustrated in FIG. 1.

A description of preferred embodiments of the invention follows. FIG. 1 is an illustration of a preferred embodiment in a computer system 10. Generally, the computer system 10 includes a digital processor 12 which hosts and executes a speech center system 20, conversation manager 28, and speech engine 22 in working memory. The input spoken utterance 14 is a voice command or other audible speech input from a user of the computer system 10 (e.g., when the user speaks into a microphone connected to the computer system 10) based on common language words. In one embodiment, the input 14 is not necessarily spoken, but is based on some other type of suitable input, such as phrases or sentences typed into a computer keyboard. The recognized spoken utterance 15 is a spoken utterance 14, recognized as a valid utterance by the speech engine 22. The speech center system 20 includes a conversation manager 28 which generates an output 16 based on the recognized spoken utterance 15. The computer system 10 also includes a domain model 70 (e.g., stored in a computer memory or data base) including syntax templates 72. The computer system 10 further includes a rules database 84 of goal-directed rules 86. The conversation manager 28 includes a reasoning facility 52 and language generation module 54 (language generator) that generates a natural language response output 78 to the recognized spoken utterance 15 based on the domain model 70, the rules database 84, and a selected syntax template 94. The selected syntax template 94 is a syntax template 72 from the domain model 70, or a language generation syntax template 74 (see FIG. 4). The output 16 is an audio command or other output that can be provided to a user through a speaker associated with the digital processor 12. The output 16 is based on the response output 78 generated by the language generation module 54. The conversation manager 28 directs the output 16 to a speech enabled external application 26 (see. FIG. 2) selected by the conversation manager 28.

Figure 3:
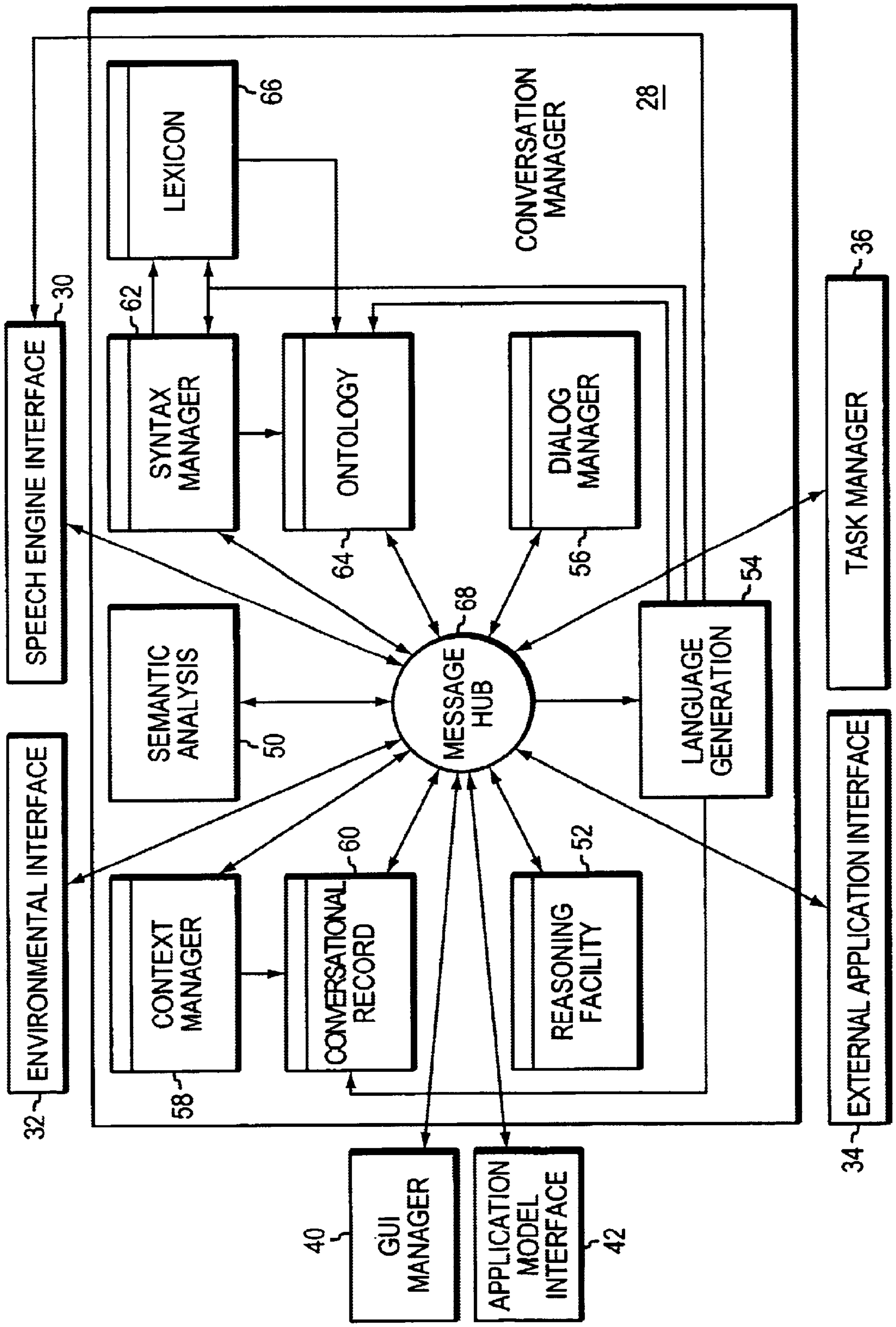
FIG. 3 is a block diagram of the components of the conversation manager illustrated in FIG. 2.

In one embodiment, a computer program product 80, including a computer usable medium (e.g., one or more CDROM's, diskettes, tapes, etc.), provides software instructions for the conversation manager 28 or any of its components, such as the reasoning facility 52 and/or the language generator 54 (see FIG. 3). The computer program product 80 may be installed by any suitable software installation procedure, as is well known in the art. In another embodiment, the software instructions may also be downloaded over an appropriate connection. A computer program propagated signal product 82 embodied on a propagated signal on a propagation medium (e.g., a radio wave, an infrared wave, a laser wave, a sound wave, or an electrical wave propagated over the Internet or other network) provides software instructions for the conversation manager 28 or any of its components, such as the reasoning facility 52 and/or the language generator 54 (see FIG. 3). In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer usable medium of the computer program product 80 is a propagation medium that the computer may receive and read, such as by receiving the propagation medium and identifying a propagated signal embodied in the propagation medium, as described above for the computer program propagated signal product 82.

FIG. 2 shows the components of a speech center system 20 configured according to the present invention. FIG. 2 also illustrates external applications 26 that communicate with the speech center 20, a speech engine 22, and an active accessability module 24. The speech center 20, speech engine 22, active accessability module 24, and external applications 26, in one aspect of the invention, may be hosted on one computer system 10. In another embodiment, one or more of the external applications 26 may be hosted and executed by a different digital processor 12 than the digital processor 12 that hosts the speech center 20. Generally, the speech center 20 (and its individual components) may be implemented as hardware or software. The speech center 20 includes a conversation manager 28, speech engine interface 30, environmental interface 32, external application interface 34, task manager 36, script engine 38, GUI manager 40, and application module interface 42.

The speech engine interface module 30 encapsulates the details of communicating with the speech engine 22, isolating the speech center 20 from the speech engine 22 specifics. In a preferred embodiment, the speech engine 22 is ViaVoice™ from IBM ®.

The environmental interface module 32 enables the speech center 20 to keep in touch with what is happening on the user's computer. Changes in window focus, such as dialogs popping up and being dismissed, and applications 26 launching and exiting, must all be monitored in order to interpret the meaning of voice commands. A preferred embodiment uses Microsoft® Active Accessibility® (MSAA) from Microsoft Corporation, Redmond, Wash., to provide this information, but again flexibility to change this or incorporate additional information sources is desirable.

The script engine 38 enables the speech center 20 to control applications 26 by executing scripts against them. The script engine 38 provides the following capabilities: The script engine 38 supports cross-application scripting via OLE (Object Linking and Embedding) automation or through imported DLL's (Dynamic Link Libraries). It is capable of executing arbitrary strings representing well formed script engine 38 statements. This enables the speech center 20 to easily compose calls to respective application operations and invoke them. The script engine 38 environment also allows the definition of new subroutines and functions that combine the primitive functionality provided by applications 26 into actions that more closely correspond to those that a user might talk about. While the speech center 20 is a script-enabled application, this does not mean that the applications 26 that it controls need to be script-enabled. In the preferred embodiment, the script engine 38 is a LotusScript engine from IBM, and so long as an application 26 provides an OLE automation or DLL interface, it will be controllable by the speech center 20. In other embodiments, the script engine 38 is a Visual Basic, Javascript, or any other suitable scripting engine.

The task manager 36 controls script execution through the script engine 38. The task manager 36 provides the capability to proceed with multiple execution requests simultaneously, to queue up additional script commands for busy applications 26, and to track the progress of the execution, informing the clients when execution of a script is in progress or has completed.

The external application interface 34 enables communications from external applications 26 to the speech center 20. For the most part, the speech center 20 can operate without any modifications to the applications 26 it controls, but in some circumstances, it may be desirable to allow the applications 26 to communicate information directly back to the speech center 20. The external application interface 34 is provided to support this kind of push-back of information. This interface 34 allows applications 26 to load custom grammars, or define task specific vocabulary. The external application interface 34 also allows applications 26 to explicitly tap into the speech center 20 for speech recognition and synthesis services.

The application model interface 42 provides models for applications 26 communicating with the speech center 20. The power of the speech center 20 derives from the fact that it has significant knowledge about the applications 26 it controls. Without this knowledge, it would be limited to providing little more than simplistic menu based command and control services. Instead, the speech center 20 has a detailed model (e.g., as part of the domain model 70) of what a user might say to a particular application 26, and how to respond. That knowledge is provided individually on an application 26 by application 26 basis, and is incorporated into the speech center 20 through the application model interface 42.

The GUI manager 40 provides an interface to the speech center 20. Even though the speech center 20 operates primarily through a speech interface, there will still be some cases of graphical user interface interaction with the user. Recognition feedback, dictation correction, and preference setting are all cases where traditional GUI interface elements may be desirable. The GUI manager 40 abstracts the details of exactly how these services are implemented, and provides an abstract interface to the rest of the speech center 20.

The conversation manager 28 is the central component of the speech center 20 that integrates the information from all the other modules 30, 32, 34, 36, 38, 40, 42. In a preferred embodiment, the conversation manager 28 is not a separate component, but is the internals of the speech center 20. Isolated by the outer modules from the speech engine 22 and operating system dependencies, it is abstract and portable. When an utterance 15 is recognized, the conversation manager 28 combines an analysis of the utterance 15 with information on the state of the desktop and remembered context from previous recognitions to determine the intended target of the utterance 15. The utterance 15 is then translated into the appropriate script engine 38 calls and dispatched to the target application 26. The conversation manager 28 is also responsible for controlling when dictation functionality is active, based on the context determined by the environmental interface 32.

FIG. 3 represents the structure of the conversation manager 28 in a preferred embodiment. Each of the functional modules, such as semantic analysis module 50, reasoning facility module 52, language generation module 54, and dialog manager 56, are indicated by plain boxes without a bar across the top. Data abstraction modules, such as the context manager 58, the conversational record 60, the syntax manager 62, the ontology module 64, and the lexicon module 66 are indicated by boxes with a bar across the top. The modules 52 through 68 of the conversation manager 28 are described below.

The message hub 68 includes message queue and message dispatcher submodules. The message hub 68 provides a way for the various modules 30, 32, 34, 36, 40, 42, and 50 through 64 to communicate asynchronous results. The central message dispatcher in the message hub 68 has special purpose code for handling each type of message that it might receive, and calls on services in other modules 30, 32, 34, 36, 40, 42, and 50 through 64 to respond to the message. Modules 30, 32, 34, 36, 40, 42, and 50 through 64 are not restricted to communication through the hub. They are free to call upon services provided by other modules (such as 30, 32, 34, 36, 40, 42, 52, 54, 56, 58, 60, 62, 64 or 66) when appropriate.

The context manager module 58 keeps track of the targets of previous commands, factors in changes in the desktop environment, and uses this information to determine the target of new commands. One example of a context manager 58 suitable for use with the invention is described in copending, commonly assigned U.S. patent application Ser. No. 09/931,505, filed Aug. 16, 2001, entitled "System and Method for Determining Utterance Context in a Multi-Context Speech Application."

The domain model 70 is a model of the "world" (e.g., concepts, or more grammatic specification, semantic specification) of one or more speech-enabled applications 26. In one embodiment, the domain model 70 is a foundation model including base knowledge common to many applications 26. In a preferred embodiment, the domain 70 is extended to include application specific knowledge in an application domain model for each external application 26.

In a conventional approach, all applications 26 have an implicit model of the world that they represent. This implicit model guides the design of the user interface and the functionality of the program. The problem with an implicit model is that it is all in the mind of the designers and developers, and so is often not thoroughly or consistently implemented in the product. Furthermore, since the model is not represented in the product, the product cannot act in accordance with the model's principles, explain its behavior in terms of the model, or otherwise be helpful to the user in explaining how it works.

In the approach of the present invention, the speech center system 20 has an explicit model of the world (e.g., domain model 70) which will serve as a foundation for language understanding and reasoning. Some of the basic concepts that the speech center system 20 models using the domain model 70 are:

| | |
|---|---|
| Things | A basic category that includes all others |
| Agents | Animate objects, people, organizations, computer programs |
| Objects | Inanimate objects, including documents and their sub-objects |
| Locations | Places in the world, within the computer, the network, and within documents |
| Time | Includes dates, as well as time of day. |
| Actions | Things that agents can do to alter the state of the world |
| Attributes | Characteristics of things, such as color, author, etc. |
| Events | An action that has occurred, will occur, or is occurring over a span of time. |

These concepts are described in the portion of the domain model 70 known as the ontology 64 (i.e., based on an ontological description). The ontology 64 represents the classes of interest in the domain model 70 and their relationships to one another. Classes may be defined as being subclasses of existing classes, for example. Attributes can be defined for particular classes, which associate entities that are members of these classes with other entities in other classes. For example, a person class might support a height attribute whose value is a member of the number class. Height is therefore a relation which maps from its domain class, person, to its range class, number.

Although the ontology 64 represents the semantic structure of the domain model 70, the ontology 64 says nothing about the language used to speak about the domain model 70. That information is contained within the syntax specification. The base syntax specification contained in the foundation domain model 70 defines a class of simple, natural language-like sentences that specify how these classes are linked together to form assertions, questions, and commands. For example, given that classes are defined as basic concepts, a simple form of a command is as follows:

```
template command (action)
<command> = <action> thing(action.patient)? manner(action)*.
```

Based on the ontology definitions of actions and their patients (the thing acted upon by an action) and on the definition of the thing and manner templates, the small piece of grammar specification shown above would cover a wide range of commands such as "move down" and "send this file to Kathy".

To describe a new speech-enabled application 26 to the conversation manager 28, a new ontology 64 for the application 26 describes the kinds of objects, attributes, and operations that the application 26 makes available. To the extent that these objects and classes fit into the built-in domain model hierarchy, the existing grammatical constructs apply to them as well. So, if an application 26 provides an operation for, say, printing it could specify:

```
print is a kind of action.
file is a patient of print.
```

and commands such as "print this file" would be available with no further syntax specification required.

The description of a speech-enabled application 26 can also introduce additional grammatical constructs that provide more specialized sentence forms for the new classes introduced. In this way, the description includes a model of the "world" related to this application 26, and a way to talk about it. In a preferred embodiment, each supported application 26 has its own domain model 70 included in its associated "application module description" file (with extension "apm").

The speech center 20 has a rudimentary built-in notion of what an "action" is. An "action" is something that an agent can do in order to achieve some change in the state of the world (e.g., known to the speech center 20 and an application 26). The speech center 20 has at its disposal a set of actions that it can perform itself. These are a subclass of the class of all actions that the speech center 20 knows about, and are known as operations. Operations are implemented as script functions to be performed by the script engine 38. New operations can be added to the speech center 20 by providing a definition of the function in a script, and a set of domain rules that describe the prerequisites and effects of the operation.

By providing the speech center system 20 with what is in effect "machine readable documentation" on its functions, the speech center 20 can choose which functions to call in order to achieve its goals. As an example, the user might ask the speech center system 20 to "Create an appointment with Mark tomorrow." Searching through its available rules the speech center 20 finds one that states that it can create an appointment. Examining the rule description, the speech center 20 finds that it calls a function which has the following parameters: a person, date, time, and place. The speech center 20 then sets up goals to fill in these parameters, based on the information already available. The goal of finding the date will result in the location of another rule which invokes a function that can calculate a date based on the relative date "tomorrow" information. The goal of finding a person results in the location of a rule that will invoke a function which will attempt to disambiguate a person's full name from their first name. The goal of finding the time will not be satisfiable by any rules that the speech center 20 knows about, and so a question to the user will be generated to get the information needed. Once all the required information is assembled, the appointment creation function is called and the appointment scheduled.

One of the most important aspects of the domain model 70 is that it is explicitly represented and accessible to the speech center system 20. Therefore, it can be referred to for help purposes and explanation generation, as well as being much more flexible and customizable than traditional programs.

The syntax manager 62 uses the grammatical specifications to define the language that the speech center 20 understands. The foundation domain model 70 contains a set of grammatical specifications that defines base classes such as numbers, dates, assertions, commands and questions. These specifications are preferably in an annotated form of Backus Naur Form (BNF), that are further processed by the syntax manager 62 rather than being passed on directly to the speech engine interface 30. For example, a goal is to support a grammatic specification for asserting a property for an object in the base grammar. In conventional Backus Naur Form (BNF), the grammatic specification might take the form:

```
<statement> = <article> <attribute> of <object> is <value>.
```

This would allow the user to create sentences like "The color of A1 is red" or "The age of Tom is 35". The sample conventional BNF does not quite capture the desired meaning, however, because it doesn't relate the set of legal attributes to specific type of the object, and it doesn't relate the set of legal values to the particular attribute in question. The grammatic specification should not validate a statement such as "The age of Tom is red", for example. Likewise, the grammatic specification disallows sentences that specify attributes of objects that do not possess those attributes. To capture this distinction in BNF format in the grammatic specification would require separate definitions for each type of attribute, and separate sets of attributes for each type of object. Rather than force the person who specifies the grammar to do this, the speech center system 20 accepts more general specifications in the form of syntax templates 72, which will then be processed by the syntax manager module 62, and the more specific BNF definitions are created automatically. The syntax template version, in one example, of the above statement is as follows:

```
template statement(object)
attribute = object%monoattributes
<statement> = <article> attribute of <object> is
<attribute.range>.
```

This template tells the syntax manager 62 how to take this more general syntax specification and turn it into BNF based on the ontological description or information (i.e., ontology 64) in the domain model 70. Thus, the grammatical specification is very tightly bound to the domain model ontology 64. The ontology 64 provides meaning to the grammatical specifications, and the grammatical specifications determine what form statements about the objects defined in the ontology 64 may take.

Given a syntax specification 72, an ontology 64, and a lexicon 66, the syntax manager 62 generates a grammatic specification (e.g., BNF grammar) which can be used by the speech engine 22 to guide recognition of a spoken utterance. The grammatic specification is automatically annotated with translation information which can be used to convert an utterance recognized by the grammatic specification to a set of script calls to the frame building functions of the semantics analysis module 50.

The lexicon 66 implements a dictionary of all the words known to the speech center system 20. The lexicon 66 provides synonyms and parts of speech information for elements of the ontological description for the domain model 70. The lexicon 66 links each word to all the information known about that word, including ontology classes (e.g., as part of the ontology 64) that it may belong to, and the various syntactic forms that the word might take.

The conversation manager 28 converts the utterance 15 into an intermediate form that is more amenable to processing. The translation process initially converts recognized utterances 15 into sequences of script calls to frame-building functions via a recursive substitution translation facility. One example of such a facility is described in U.S. patent application Ser. No. 09/342,937, filed Jun. 29, 1999, entitled "Method and Apparatus for Translation of Common Language Utterances into Computer Application Program Commands," the entire teachings of which are incorporated herein by reference. When these functions are executed, they build frames within the semantic analysis module 50 which serve as an initial semantic representation of the utterance 15. The frames are then processed into a series of attribute-object-value triples, which are termed "propositions". Frame to attribute-object-value triple translation is mostly a matter of filling in references to containing frames. These triples are stored in memory, and provide the raw material upon which the reasoning facility 52 operates. A sentence such as "make this column green" would be translated to a frame structure by a series of calls like these:

```
Begin("command")
    AssociateValue("action")
    Begin("action")
        AssociateClass("make")
        AssociateValue("patient")
        Begin("thing")
            AssociateClass("column")
        End("thing")
        AssociateValue("destination")
        AssociateParameter("green")
    End("action")
End("command")
```

After the frame representation of the sentence is constructed, it is converted into a series of propositions, which are primarily attribute-object-value triples. A triple X Y Z can be read as "The X of Y is Z" (e.g., the color of column is green). The triples derived from the above frame representation are shown in the example below. The words with numbers appended to them in the example represent anonymous objects introduced by the speech center system 20.

```
Class Command-1 Command
Class Action-1 Make
Action Command-1 Action-1
Class Thing-1 Column
Patient Action-1 Thing-1
Destination Action-1 Green
```

The set of triples generated from the sentence serve as input to the reasoning facility 52, which is described below. Note that while much has been made explicit at this point, not everything has. The reasoning facility 52 still must determine which column to operate upon, for example.

The reasoning facility 52 performs the reasoning process for the conversation manager 28. The reasoning facility 52 is a goal-directed rule based system composed of an inference engine, memory, rule base and agenda. Rules consist of some number of condition propositions and some number of action propositions. Each rule represents a valid inference step that the reasoning facility 52 can take in the associated domain 70. A rule states that when the condition propositions are satisfied, then the action propositions can be concluded. Both condition and action propositions can contain embedded script function calls, allowing the rules to interact with both external applications 26 and other speech center 20 components. Goals are created in response to user requests, and may also be created by the inference engine itself. A goal is a proposition that may contain a variable for one or more of its elements. The speech center system 20 then attempts to find or derive a match for that proposition, and find values for any variables. To do so, the reasoning facility 52 scans through the rules registered in the rule base, looking for ones whose actions unify with the goal. Once a matching rule has been found, the rule's conditions must be satisfied. These become new goals for the inference engine of the reasoning facility 52 to achieve, based on the content of the memory and the conversational record. When no appropriate operations can be found to satisfy a goal, a question to the user will be generated. The reasoning facility 52 is primarily concerned with the determination of how to achieve the goals derived from the user's questions and commands.

Conversational speech is full of implicit and explicit references back to people and objects that were mentioned earlier. To understand these sentences, the speech center system 20 looks at the conversational record 60, and finds the missing information. Each utterance is indexed in the conversational record 60, along with the results of its semantic analysis. The information is eventually purged from the conversational record when it is no longer relevant to active goals and after some predefined period of time has elapsed.

For example, after having said, "Create an appointment with Mark at 3 o'clock tomorrow", a user might say "Change that to 4 o'clock." The speech center system 20 establishes that a time attribute of something is changing, but needs to refer back to the conversational record 60 to find the appointment object whose time attribute is changing. Usually, the most recently mentioned object that fits the requirements will be chosen, but in some cases the selection of the proper referent is more complex, and involves the goal structure of the conversation.

The dialog manager 56 serves as a traffic cop for information flowing back and forth between the reasoning facility 52 and the user. Questions generated by the reasoning facility 52 as well as answers derived to user questions and unsolicited announcements by the speech center system 20 are all processed by the dialog manager 56. The dialog manager 56 also is responsible for managing question-answering grammars, and converting incomplete answers generated by the user into a form understandable by the reasoning facility 52.

The dialog manager 56 has the responsibility for deciding whether a speech center-generated response should be visible or audible. It also decides whether the response can be presented immediately, or whether it must ask permission first. If an operation is taking more than a few seconds, the dialog manager 60 generates an indication to the user that the operation is in progress.

Figure 4:
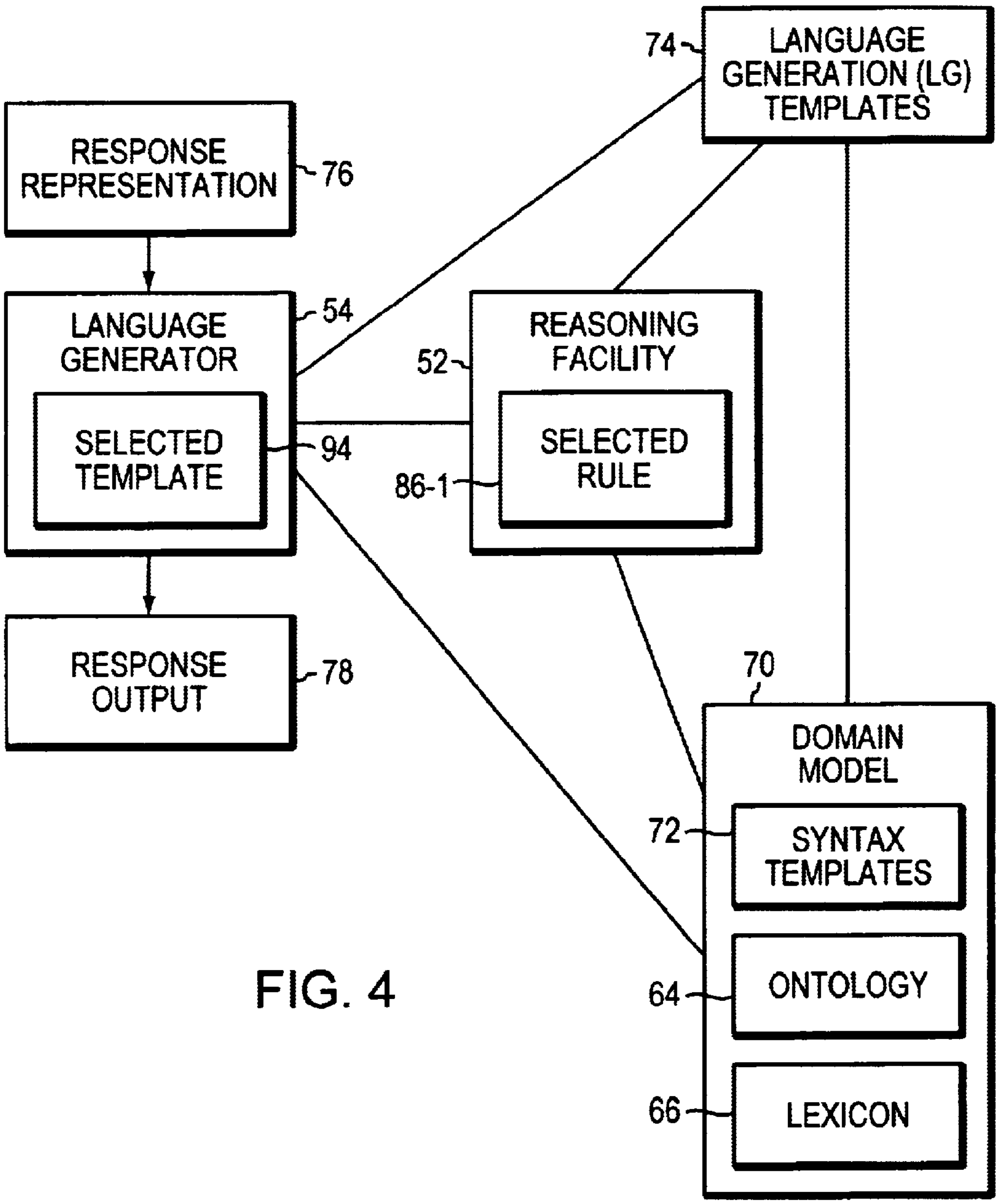
FIG. 4 is a block diagram of the language generation module and associated components according to the present invention.

FIG. 4 is a block diagram of the language generation module 54 (language generator) and associated components (reasoning facility 52, domain model 70, and language generation (LG) templates 74) according to the present invention. The domain model 70 includes domain model syntax templates 72, the ontology 64, and the lexicon 66. The response representation 76 is an internal representation (e.g., formal belief structure of one or more propositions) generated by the reasoning facility 52 in response to the recognized spoken utterance 15. The response output 78 is a natural language response (e.g., text string), such as a statement or question, generated by the language generation module 54.

When questions or responses to the user are derived by the reasoning facility 52, they must be translated back into natural language by the language generation module 54. In a preferred embodiment, the language generation module 54 takes advantage of the knowledge stored in the syntax manager 62, domain model 70, lexicon 66, and conversational record 60 in order to generate the natural language output 78. In one embodiment, the language generation module 54 generates language from the same syntax templates 72 used for recognition, or from additional templates provided specifically for language generation. These additional templates are the language generation (LG) templates 74. The reasoning facility determines a selected rule 86-1 from the rules 86 in the rule base 84 based on the response representation 76. The selected rule 86-1 indicates which template 72 or 74 is appropriate for the language generation task at hand.

An example of the generation of a response 78 from a set of propositions (response representation 76) is shown below. This example shows the LG syntax template (e.g., 74) along with parts of the ontology 64 and lexicon 66 that are mentioned in the template 74. The example also shows the rule 86-1 for choosing the LG syntax template 74. In this example, the desired output 78 is a verification that a desired meeting has in fact been scheduled: "Your appointment has been scheduled with Jane Doe and John Smith for tomorrow at 1 PM."

The relevant pieces of the ontology 64 for this example describe commands, appointments, people, etc., such as the following:

```
Thing is a class.
A date is a kind of thing.
A time is a kind of thing.
tomorrow is a date.
An event is a kind of thing.
An event has a startTime which is a time.
An event has a startDate which is a date.
An event has an endTime which is a time.
An event has an endDate which is a date.
A location is a kind of thing.
An actor is a kind of thing.
A person is a kind of actor.
A person has a name.
A person has a firstName.
A person has a lastName.
A window is a kind of location.
A document is a kind of window.
A document has a new property.
A message is a kind of document.
A message has a subject which is a string.
A message has a body which is a string.
A message has a source which is a person.
A message has a destination which is a set of people.
A message has a date.
A message has a time.
A reminder is a kind of event.
An invitation is a kind of reminder.
An invitation has a location.
An invitation has participants which are a set of people.
An appointment is a kind of invitation.
An action is a kind of thing.
Schedule is an action.
```

-continued

```
Schedule has a patient which is a reminder.
Utterance is a class.
A command is a kind of utterance.
A command has an executed property.
A command has an action.
```

To create the response string 78, the language generation module 54 uses the propositions received as in the response representation 76 (the formal belief structure representing what the conversational system 28 wants to tell the user) from the reasoning facility 52. The following is an example of the propositions:

```
Command1 is executed.
The action of Command1 is Schedule1.
The patient of Schedule1 is Person1.
The name of Person1 is "Jane Doe".
A participant of Appointment1 is Person2
The name of Person2 is "John Smith".
The startTime of Appointment1 is "1 PM".
The startDate of Appointment1 is tomorrow.
```

The language generator module 54 makes the following assertions based on the propositions of the response representation 76:

```
ar1 is an answerResponse.
the ResponseType of ar1 is goalCompletion.
the displayMode of ar1 is Verbal.
ar1 is propositionSpeakable.
the attribute of ar1 is "action"
the object of ar1 is "Command1"
the value of ar1 is "Schedule1"
```

An "answerResponse" is an object that exists to allow the language generation module 54 to represent information about its input propositions (response representation 76) in a form that rules can then use to determine the appropriate syntax template (72 or 74) to use. The language generation module 54 then creates another goal expressed as the proposition

```
the generatedText of ar1 is ?.
```

and sends it to the reasoning facility 52.

Based on the goal provided by the language generation module 54, the reasoning facility 52 selects rule 86-1. Thus, the following rule 86-1 is invoked (i.e., fired):

```
Rule "GenerateAnswerText - Verbal Goal completion
announcement"
if the ResponseType of an answerResponse is goalCompletion
and the displayMode of the answerResponse is Verbal
and a command is answerResponse object
and the command is executed
then the generatedText of the answerResponse is
    LGInstantiateTemplate (answerResponse,
"CommandExecutedResponse", command).
Endrule
```

When the above rule is invoked, the rule selects the response syntax template 94 (from the LG syntax templates 74), for example:

```
LGTemplate CommandExecutedResponse (command)
    <CommandExecutedResponse> = Your command.action.patient
        command.action.pastPerfective manner
        (command.action)*
        characteristic (command.action.patient)*.
```

In this case, the language generation module 54 generates text for all manners and characteristics that have been asserted for action and its patient. "Manner" and characteristic" are other syntax templates 72 from the domain model 70 that are invoked by this selected syntax template 94 shown above. This selected syntax template 94 is an example of a general syntax template that can apply to almost any command. Given that the ontology 64 and lexicon 66 entries have been appropriately defined, this sample selected syntax template 94 can apply equally well to "Your file has been printed on LDB4W-2", "Your XYZ stock has been sold at 50", or "Your flight has been booked with ABC Airlines for next Wednesday at 6 PM".

The selected syntax template 94 refers to the "characteristics" syntax template 72 from the domain model 70. The syntax template 72 for characteristics is a syntax template 72 rather than a language generation template 74, and is thus shared between both recognition and synthesis—an example of "say what you hear" consistency. An example of the characteristics syntax template 72 is as follows:

```
template characteristics (thing)
    <characteristics> = <from> thing (thing.source)
                      | <to> thing (thing.destination)
                      | <with> set (thing.participant)
                      | <for> <thing.date>
                      | <on> <thing.date>
                      | <at> <thing.date>
                      | <at> thing(thing.location)
                      | <in> thing(thing.location
                      | <at> thing(thing.time)
                      | <about> <thing.subject>.
```

Characteristics include phrases like "with John Smith and Jane Doe," "for tomorrow," and "at 1 PM". The ordering of these phrases in the output 78 is determined by their order in the characteristics syntax template 72.

The term "command.action.pastPerfective" is an example of a lexicon 66 reference. It allows syntax templates 72, 74 to access a variety of grammatical forms. In this case, since the action is "schedule," the past perfective form is "has been scheduled".

The language generation module 54 maps "command.action.patient" to the class of "Appointment1" (appointment), and the argument of characteristic to the entity "Appointment1". The language generation module 54 then uses the selected syntax template 94 to generate the string "Your appointment has been scheduled with John Smith and Jane Doe for tomorrow at 1 PM".

In a preferred embodiment, the LG syntax templates 74 are defined at the top level for speech center-generated questions and assertions (these are distinguished with an "LGTemplate" label from other syntax templates 72 in a syntax template file). These LG templates 74 can then reference new or existing (i.e. background or foreground) templates 72 in the domain model 70, where the majority of information about syntactic forms in the speech center 20 is represented. The special LG templates 74 are defined for the language generation module 54 for two reasons. One reason is to avoid having computer-generated questions and responses appear in the user input grammars. Another reason is to control the argument structure to pass arguments as needed.

As described above, the language generation module 54 uses rules 86 to choose an appropriate LG template 74 to instantiate. All of the LG templates 74 are indexed by their argument lists. This indexing allows the language generator module 54 to easily access the relevant LG template 74 for a given generation task (since many templates 74 are polymorphic). The typical task for the language generation module 54 is to generate a question given a goal (primarily a proposition) or a response, given a list of propositions. For example, "The meeting has been scheduled with Kathy and Whitney at 3 PM tomorrow" consists of nine propositions, which are structured as a top-level proposition and associated propositions:

```
Command1001 is executed.
The action of Command1001 is Schedule607.
The patient of Schedule607 is Meeting405.
A participant of Meeting405 is Person12.
The firstName of Person12 is Kathy.
A participant of Meeting405 is Person13.
The firstName of Person13 is Whitney.
The startTime of Meeting405 is 3 PM.
The date of Meeting405 is tomorrow.
```

In one embodiment, the response representation 76, such as the example immediately above, is structured with a single top-level proposition, the subject and values of which are associated with any other propositions which are to be communicated.

An example of an LG syntax template 74 that would be relevant if the start time of the meeting had not yet been set, is as follows:

```
LGTemplate MeetingStartYesNoQuery (meeting)
    <MeetingStartYesNoQuery> = Would you like to schedule the
meeting for <meeting.startTime> "?" |
        How about <meeting.startTime> "?" |
        Would you like to schedule the meeting
            characteristic(meeting)* "?".
```

Figure 5:
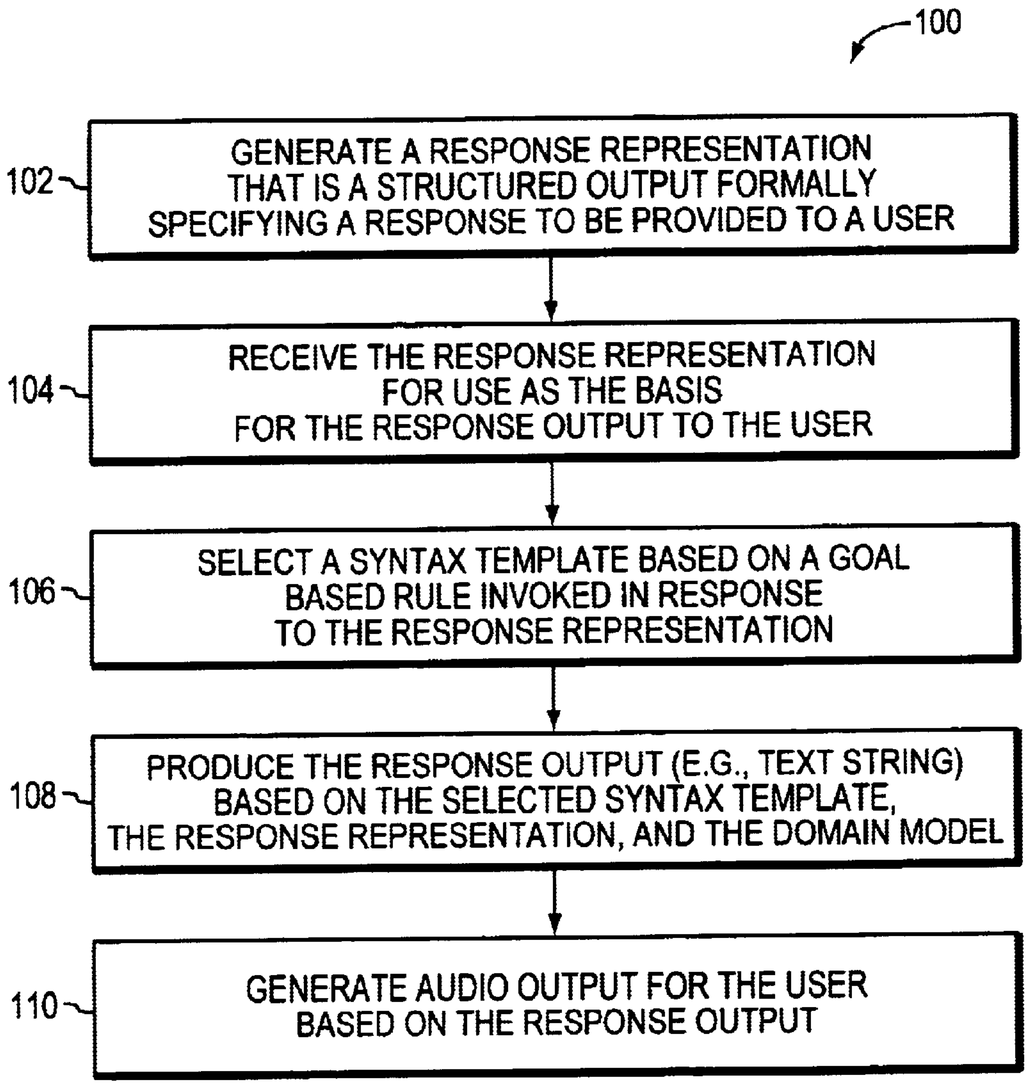
FIG. 5 is a flow chart of a procedure for generating a response output for FIG. 4.

FIG. 5 is a flow chart of a procedure for generating a response output 78 for FIG. 4. In step 102, the reasoning facility 52 generates the response representation 76, which is the structured output (formal belief structure) that formally specifies the response (or goal) to be provided to a user of the computer system 10. The response representation 76 is based on a spoken utterance 14 that the user of the computer system 10 has spoken into a microphone associated with the computer system 10.

In step 104, the language generation module 54 receives the response representation 76 (indicating an assertion or question) from the reasoning facility 52 for use as the basis for the response output 78 to be provided to the user in step 110. Alternatively, the reasoning facility 52 provides the response representation 76 to a dialog manager 56 which manages a dialog between the computer system 10 and the user of the computer system 10, and then the dialog manager 56 provides the response representation 76 to the language generation module 54.

In step 106, the reasoning facility 52 selects a syntax template 94 (from templates 72 or 74) based on a goal-based rule 86-1 invoked in response to the response representation 76. In particular, the language generation module 54 provides the response representation 76 to the reasoning facility 52 to determine (e.g., select) a rule 86 from the rules database 84 for the language generation module 54 to use in generating the response output 78. The reasoning facility 52 invokes the selected rule 86-1 to determine the selected syntax template 94.

In step 108, the language generation module 54 produces the response output 78 (e.g., text string) based on the selected syntax template 94, the response representation 76, and the domain model 70. The language generation module 54 uses the selected syntax template 94 to process the formal structure (propositions) of the response representation 76. Where appropriate, the language generation module 54 uses other syntax templates 72 from the domain model 70 that are referenced in the syntax template 94. The language generations module 54 thus produces a natural language assertion or question in the response output 78 based on the response representation 76. The natural language assertion or statement of the response output 78 may represent a set of propositions in the response representation 76, and a natural language question may represent a goal (also expressed as a proposition) in the response representation 76.

In step 110, the speech center 20, through the speech engine 22, generates an audio output 16 for the user based on the response output 78. For example, the speech engine 22 generates and plays the audio output 16 to the user through a speaker associated with the computer system 10. In one embodiment, the dialog manager 56 controls the timing of the conversion of the response output 78 to the audio output 16 and thus the timing of the delivery of the audio output 16 to the user of the computer system 10.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer method for generating a response output to be provided to a user of a computer; the method comprising the steps of:

receiving a response representation specifying a structured output for use as the basis for the response output to the user, the response representation associated with a domain model for a speech-enabled application;

selecting a syntax template based on a goal-directed rule invoked in response to the response representation, including generating a goal based on the response representation and determining the selected syntax template based on the goal-directed rule selected from a goal-oriented rules database based on the goal, the goal-directed rule identifying the selected syntax template; and producing the response output based on the selected syntax template, the response representation, and the domain model.

2. The computer method of claim 1, wherein the response representation is received from a reasoning facility that generates the response representation based on the domain model, a goal-directed rules database, and a spoken utterance provided by the user.

3. The computer method of claim 2, wherein the response representation is a goal or proposition based on the spoken utterance.

4. The computer method of claim 3, wherein the proposition comprises an attribute, an object, and a value.

5. The computer method of claim 1, wherein the domain model comprises an ontological description of the domain model based on entities, classes, and attributes, and a lexicon providing synonyms and parts of speech information for elements of the ontological description.

6. The computer method of claim 1, wherein the response output is a text string capable of conversion to audio output.

7. A system for generating a response output to be provided to a user of a computer, the system comprising:

a language generator for receiving a response representation specifying a structured output for use as the basis for the response output to the user, the response representation associated with a domain model for a speech-enabled application; and a reasoning facility coupled to the language generator, the reasoning facility for selecting a syntax template based on a goal-directed rule invoked in response to the response representation, the language generator producing the response output based on the selected syntax template, the response representation, and the domain model, wherein the language generator generates a goal based on the response representation and provides the goal to the reasoning facility, and the reasoning facility determines the selected syntax template based on the goal-directed rule selected from a goal-oriented rules database based on the goal, the goal-directed rule identifying the selected syntax template.

8. The system of claim 7, wherein the language generator receives the response representation from the reasoning facility that generates the response representation based on the domain model, a goal-directed rules database, and a spoken utterance provided by the user.

9. The system of claim 8, wherein the response representation is a goal or proposition based on the spoken utterance.

10. The system of claim 9, wherein the proposition comprises an attribute, an object, and a value.

11. The system of claim 7, wherein the domain model comprises an ontological description of the domain model based on entities, classes, and attributes, and a lexicon providing synonyms and parts of speech information for elements of the ontological description.

12. The system of claim 7, wherein the response output is a text string capable of conversion to audio output.

13. A computer program product comprising:

a computer usable medium for generating a response output to be provided to a user of a computer;

a set of computer program instructions embodied on the computer usable medium, including instructions to:

receive a response representation specifying a structured output for use as the basis for the response output to the user, the response representation associated with a domain model for a speech-enabled application;

select a syntax template based on a goal-directed rule invoked in response to the response representation, including generating a goal based on the response representation and determining the selected syntax template based on the goal-directed rule selected from a goal-oriented rules database based on the goal, the goal-directed rule identifying the selected syntax template; and produce the response output based on the selected syntax template, the response representation, and the domain model.

14. The computer program product of claim 13, wherein the response representation is received from a reasoning facility that generates the response representation based on the domain model, a goal-directed rules database, and a spoken utterance provided by the user.

15. The computer program product of claim 14, wherein the response representation is a goal or proposition based on the spoken utterance.

16. The computer program product of claim 15, wherein the proposition comprises an attribute, an object, and a value.

17. The computer program product of claim 13, wherein the domain model comprises an ontological description of the domain model based on entities, classes, and attributes, and a lexicon providing synonyms and parts of speech information for elements of the ontological description.

18. The computer program product of claim 13, wherein the response output is a text string capable of conversion to audio output.

19. A system for generating a response output to be provided to a user of a computer; the system comprising:

means for receiving a response representation specifying a structured output for use as the basis for the response output to the user, the response representation associated with a domain model for a speech-enabled application;

means for selecting a syntax template based on a goal-directed rule invoked in response to the response representation, including generating a goal based on the response representation and determining the selected syntax template based on the goal-directed rule selected from a goal-oriented rules database based on the goal, the goal-directed rule identifying the selected syntax template; and means for producing the response output based on the selected syntax template, the response representation, and the domain model.

20. A computer program propagated signal product comprising:

a computer usable propagated medium for generating a response output to be provided to a user of a computer; and a set of computer program instructions embodied on the computer usable propagated medium, including instructions to:

receive a response representation specifying a structured output for use as the basis for the response output to the user, the response representation associated with a domain model for a speech-enabled application;

select a syntax template based on a goal-directed rule invoked in response to the response representation, including generating a goal based on the response representation and determining the selected syntax template based on the goal-directed rule selected from a goal-oriented rules database based on the goal, the goal-directed rule identifying the selected syntax template; and produce the response output based on the selected syntax template, the response representation, and the domain model.

* * * * *